(12) United States Patent
Nakagawa et al.

(10) Patent No.: US 7,561,225 B2
(45) Date of Patent: Jul. 14, 2009

(54) LIQUID CRYSTAL DISPLAY DEVICE

(75) Inventors: Taiji Nakagawa, Tottori (JP); Yuki Muraoka, Tottori (JP); Takuya Nishimoto, Tottori (JP); Kensuke Nobeoka, Tottori (JP)

(73) Assignee: Epson Imaging Devices Corporation, Nagano (JP)

( * ) Notice: Subject to any disclaimer, the term of this patent is extended or adjusted under 35 U.S.C. 154(b) by 301 days.

(21) Appl. No.: 11/645,592

(22) Filed: Dec. 27, 2006

(65) Prior Publication Data

US 2007/0146571 A1   Jun. 28, 2007

(30) Foreign Application Priority Data

Dec. 27, 2005  (JP)  ............................. 2005-374332
Sep. 29, 2006  (JP)  ............................. 2006-269554

(51) Int. Cl.
*G02F 1/1333* (2006.01)
(52) U.S. Cl. ..................................... 349/60
(58) Field of Classification Search ............... 349/60
See application file for complete search history.

(56) References Cited

U.S. PATENT DOCUMENTS 6,693,682 B2 * 2/2004 Fujishiro et al. .............. 349/65
7,427,155 B2 * 9/2008 Nakagawa et al. .......... 362/634

FOREIGN PATENT DOCUMENTS

JP   2005-37814   2/2005

\* cited by examiner

*Primary Examiner*—Jerry T Rahll
(74) *Attorney, Agent, or Firm*—McDermott Will & Emery LLP

(57) ABSTRACT

Provided is a liquid crystal display device that offers improved heat dissipation and that can prevent a light source from being damaged when such liquid crystal display device is vibrated or dropped. The liquid crystal display device is provided with a liquid crystal cell 2, illuminating means 3 that is located behind the liquid crystal cell 2, and a frame body 4 that supports the liquid crystal cell 2 and the illuminating means 3. The illuminating means 3 includes a light guide plate 9, light sources 13 and 14 that are located so as to face one side face of the light guide plate 9, and a holder 12 that supports the light sources 13 and 14. There is provided a reinforcing member 15 between the light guide plate 9 and the holder 12, and there is provided a shock-absorbing member 16 located on a side face of the reinforcing member 15 and that makes contact with or lies adjacent to the one side face of the light guide plate 9.

7 Claims, 12 Drawing Sheets

– 1 –

LIQUID CRYSTAL DISPLAY DEVICE

This application is based on Japanese Patent Applications Nos. 2005-374332 and 2006-269554 filed on Dec. 27, 2005 and Sep. 29, 2006 respectively, the contents of which are hereby incorporated by reference.

BACKGROUND OF THE INVENTION

1. Field of the Invention

The present invention relates to a liquid crystal display device.

2. Description of Related Art

A conventionally known example of such a liquid crystal display device is disclosed, for example, in JP-A-2005-037814. The liquid crystal display device disclosed in this publication is provided with a box-shaped rear frame, a reflecting plate provided thereon, illuminating means, a liquid crystal cell, and a front-face frame. Outside the rear frame, a radiator plate is fixed in such a way as to cover the rear frame.

A first disadvantage of the liquid crystal display device described above is poor heat dissipation. Through a study in search of the causes, the inventors of the present invention have found out that heat given off by the light source is released into the outside air through a four-layer structure in which the rear frame, the reflecting plate, and the light guide plate are laid on the radiator plate and above which the liquid crystal cell is disposed, and that this four-layer structure facilitates heat accumulation and results in poor heat dissipation. Furthermore, a second disadvantage of the liquid crystal display device described above is that, in a case where a plurality of such liquid crystal display devices are transported by truck or the like, the light guide plate moves from side to side and often causes damage to the light source.

SUMMARY OF THE INVENTION

In view of the conventionally experienced disadvantages described above, it is an object of the present invention to provide a liquid crystal display device that offers improved heat dissipation and that can prevent a light source from being damaged when such a liquid crystal display device is vibrated or dropped.

To achieve the above object, according to the present invention, a liquid crystal display device is provided with a liquid crystal cell, illuminating means that is located behind the liquid crystal cell, and a frame body that supports the liquid crystal cell and the illuminating means. Here, the illuminating means includes a light guide plate, a light source that is located so as to face one side face of the light guide plate, and a holder that supports the light source. There is provided a reinforcing member between the light guide plate and the holder, and there is provided a shock-absorbing member located on a side face of the reinforcing member and that makes contact with or lies adjacent to the one side face of the light guide plate.

As described above, the reinforcing member is provided between the one side face of the light guide plate and the holder, and the shock-absorbing member that makes contact with or lies adjacent to the side face of the reinforcing member is provided. As a result, even when the light guide plate is moving toward the holder when the liquid crystal display device is vibrated or dropped, the reinforcing member having the shock-absorbing member prevents such movement. This prevents the light source housed in the holder from being exposed to external pressure, making the light source less likely to be damaged.

According to the present invention, since a radiator plate on which the light guide plate and the reflecting plate are laid is exposed through an opening of the frame body, heat given off by the light source is released into the outside air through a three-layer structure composed of the light guide plate, the reflecting plate, and the radiator plate. This improves heat dissipation.

DETAILED DESCRIPTION OF PREFERRED EMBODIMENTS

Hereinafter, embodiments of the present invention will be described specifically with reference to the accompanying drawings. It should be understood, however, that the embodiments presented below are simply intended to give an example of a liquid crystal display device that embodies the technical idea of the present invention, and therefore the liquid crystal display device specifically described below is not intended to limit in any way the manner in which to carry out the present invention. That is, the present invention finds wide application in the technical fields to which the appended claims are directed.

Embodiment 1

Figure 1:
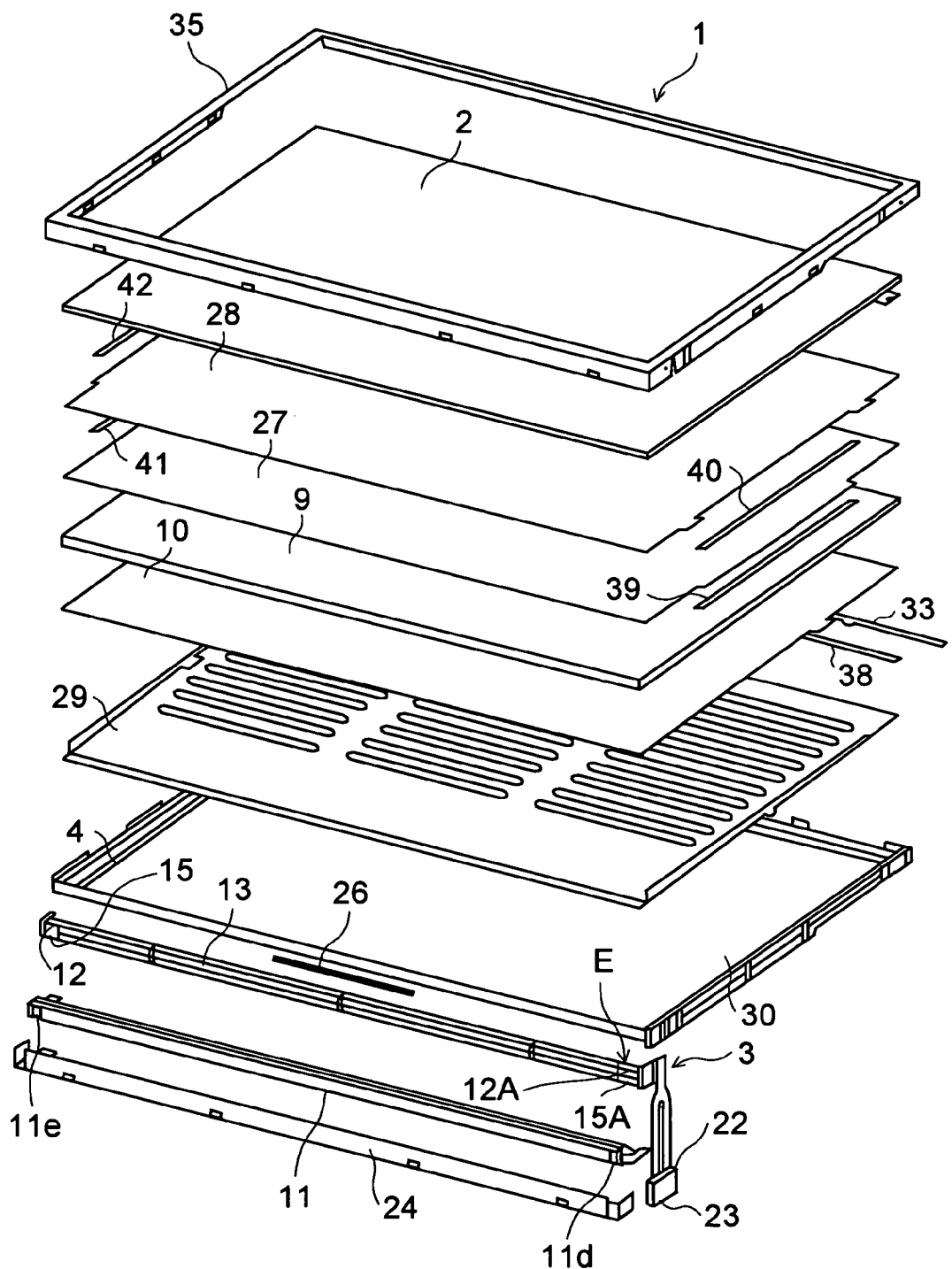
FIG. 1 is an exploded perspective view of the liquid crystal display device of an embodiment of the present invention.
Figure 2:
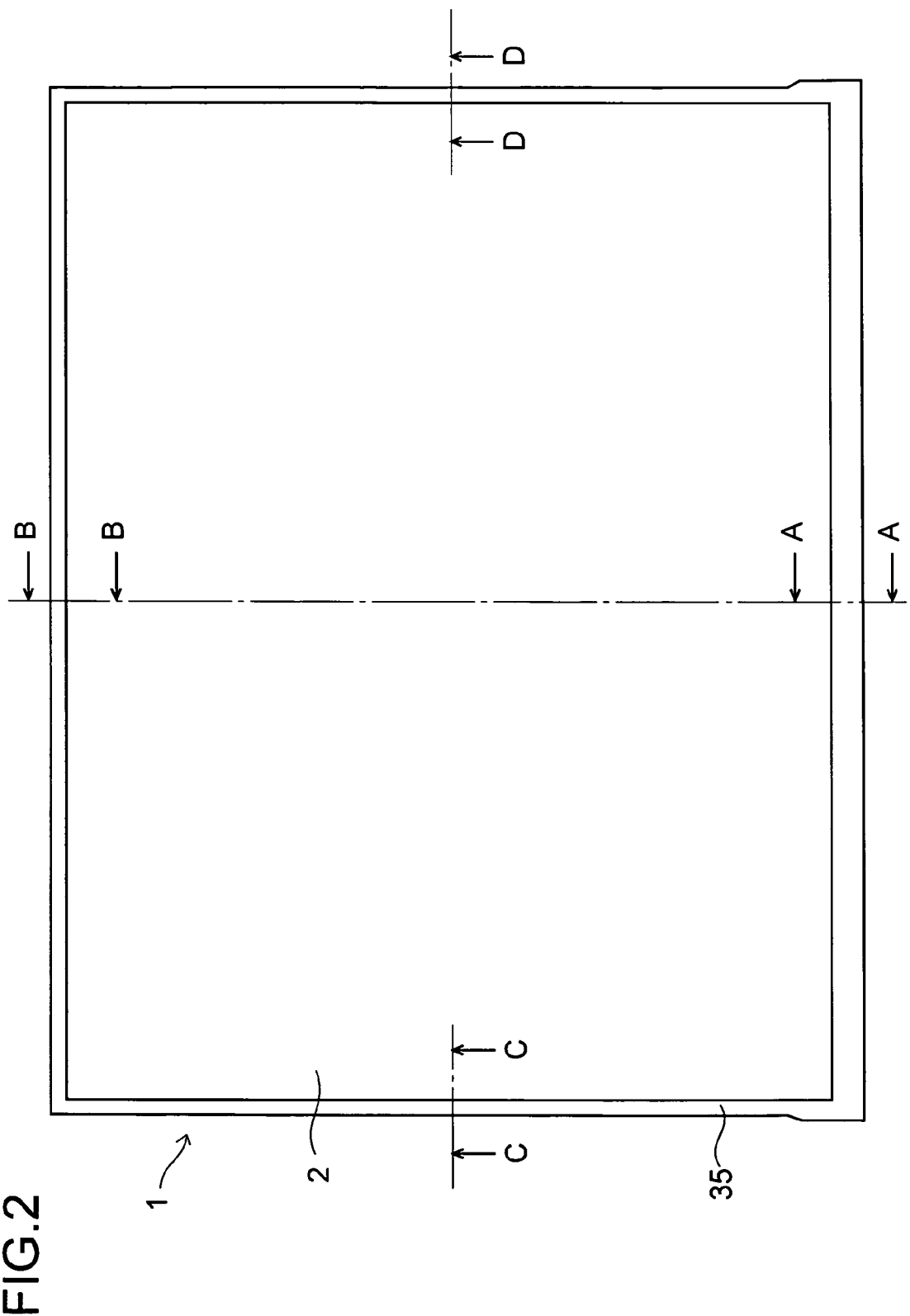
FIG. 2 is a front view of the liquid crystal display device (in a completely assembled state)

FIG. 1 is an exploded perspective view of a liquid crystal display device 1 embodying the present invention. FIG. 2 is a front view of the liquid crystal display device 1 (in a completely assembled state). FIGS. 3, 4, 5, and 6 are sectional views taken on the lines A-A, B-B, C-C, and D-D, respectively, of FIG. 2. FIG. 7 is a perspective view from the direction indicated by arrow E shown in FIG. 1.

As shown in these figures, the liquid crystal display device 1 is composed of, for example, a liquid crystal cell 2, illuminating means 3, and a frame body that supports the liquid crystal cell 2 and the illuminating means 3.

The liquid crystal cell 2 is built with a pair of glass substrates 5 and 6 bonded together with a sealing material (not shown) applied near the peripheries thereof, and liquid crystal sealed between them.

Furthermore, one glass substrate 6 has a plurality of unillustrated terminals to which a plurality of TCPs (tape carrier packages) 7 having mounted thereon a driving IC (not shown) are attached. Some of the other ends of the TCPs 7 are connected to an unillustrated control board (see FIG. 5).

Figure 3:
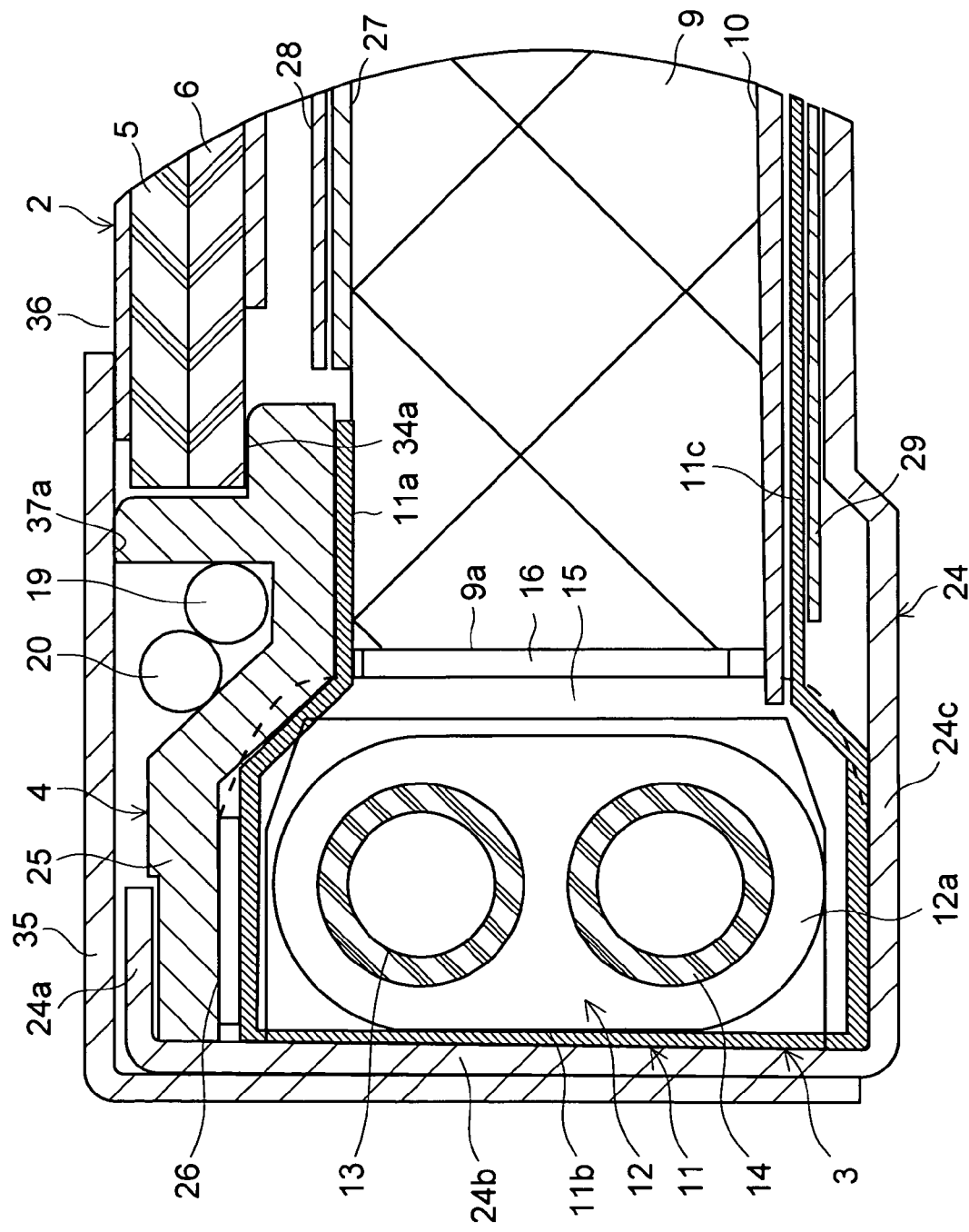
FIG. 3 is a sectional view taken on the line A-A of FIG. 2.

The illuminating means 3 is located behind the liquid crystal cell 2 (i.e. behind a display surface), and is built with, for example, a light guide plate 9, a reflecting plate 10, a reflector 11, a holder 12, light sources 13 and 14, a reinforcing member 15, a shock-absorbing member 16, and a radiator plate 29 (see FIG. 3). The frame body that supports the illuminating means 3 is built with a first supporting member 4, a second supporting member 33, and a bottom plate 24.

The light guide plate 9 is made of, for example, acrylic resin, and is rectangular as seen in a plan view. The light guide plate 9 is so formed, as seen in cross-section, as to get thicker toward a side face 9a thereof (see FIG. 3) and get thinner toward a side face 9b thereof (see FIG. 4). The light guide plate 9 is formed in the shape of a wedge. That is, the light guide plate 9 is so formed as to have a horizontal top face and an inclined bottom face.

The reflecting plate 10 is made of a reflecting material, and is so located as to make contact with the bottom face of the light guide plate 9. The reflecting plate 10 is located in such a way that the left edge thereof slightly protrudes leftward beyond the side face 9a of the light guide plate 9 (see FIG. 3), and that the right edge thereof is slightly displaced leftward from the side face 9b of the light guide plate 9 (see FIG. 4).

The reflector 11 is made of, for example, aluminium, and is formed, as seen in cross-section, in substantially the shape of a letter C (see FIG. 3) so as to cover the light sources 13 and 14 from three directions (three out of four directions determined in an x-y coordinate system in FIG. 3, excluding the direction in which the light guide plate 9 is located). As seen in a plan view, the reflector 11 has an elongate shape (see FIG. 1).

The reflector 11 has a top face 11a, a side face 11b and a bottom face 11c. The reflector 11 has formed therein notch portions 11d and 11e near both edges thereof (see FIGS. 1 and 7). Both the notch portions 11d and 11e are obtained by notching part of the top face 11a and part of the bottom face 11c.

The holder 12 is made of, for example, silicon rubber. As seen in cross-section, the holder 12 has formed therein holes for holding the light sources 13 and 14, and includes an oblong portion 12a (see FIG. 3).

The holder 12 and a holder 12A are formed symmetrically with respect to a plane (see FIG. 1). The holder 12A has formed therein an outlet portion 12b connected to the oblong portion 12a thereof. The outlet portion 12b is formed in substantially the shape of a rectangular tube, and is connected to the holes for holding the light sources 13 and 14 via inner passages. In the holder 12A, lead wires 17 and 18 are arranged (see FIG. 7).

As described above, one notch portion 11d is formed near the holder 12A, and the other notch portion 11e is formed near the holder 12.

The light sources 13 and 14 are each a linear light source built with a cold-cathode tube and the like. One end of the light source 13 is inserted into the hole of the holder 12A and fixed therein. Likewise, the other end of the light source 13 is inserted into the hole of the holder 12 and fixed therein.

One end of the light source 14 is inserted into the hole of the holder 12A and fixed therein. Likewise, the other end of the light source 14 is inserted into the hole of the holder 12 and fixed therein.

The lead wire 18 is connected, at one end thereof where the coating of the conducting wire is stripped off, to one electrode of the light source 13 by soldering or the like. Likewise, the lead wire 17 is connected, at one end thereof where the coating of the conducting wire is stripped off, to one electrode of the light source 14 by soldering or the like.

The lead wire 19 is connected, at one end thereof where the coating of the conducting wire is stripped off, to the other electrode of the light source 13 by soldering or the like.

Likewise, the lead wire 20 is connected, at one end thereof where the coating of the conducting wire is stripped off, to the other electrode of the light source 14 by soldering or the like (see FIG. 3).

The other ends of the lead wires 18 and 19 are connected to a connector 22, and the other ends of the lead wires 17 and 20 are connected to a connector 23.

As described above, the reflector 11 is provided so as to cover the light sources 13 and 14 supported by the holders 12 and 12A and cover the edge portions of the light guide plate 9 and the reflecting plate 10, so that the light sources 13 and 14 are made to face the side face 9a of the light guide plate 9.

The reinforcing members 15 and 15A are both made of a metal plate, and are both formed, as seen in cross-section, in substantially the shape of a letter C which is opposite in direction to the reflector 11 so as to cover the holders 12 and 12A from three directions (see FIGS. 1 and 3).

The reinforcing member 15A fits in the notch portion 11d in such a way as to cover the holder 12A, and the reinforcing member 15 fits in the notch portion 11e in such a way as to cover the holder 12.

The bottom plate 24 is made of, for example, a metal plate, and, as seen in cross-section (see FIG. 3), has an angled shape. As seen in a plan view (see FIG. 1), the bottom plate 24 has an elongate shape.

The bottom plate 24 has a top face 24a, a side face 24b, and a bottom face 24c. The side face 24b of the bottom plate 24 is located so as to make contact with the side face 11b of the reflector 11.

The reinforcing member 15A is located between the inner surface of the side face 24b formed in the bottom plate 24 and the inner surface of the notch portion 11d so as to make contact therewith or to lie adjacent thereto (for example, with a clearance of 0.1 to 0.3 mm).

The reinforcing member 15 is located between the inner surface of the side face 24b formed in the bottom plate 24 and the inner surface of the notch portion 1e so as to make contact therewith or to lie adjacent thereto (for example, with a clearance of 0.1 to 0.3 mm).

The shock-absorbing members 16 and 16A are made of a material such as polyethylene terephthalate resin that is softer than metal and harder than sponge, and are provided with a binding material on the back face thereof. The width of the shock-absorbing members 16 and 16A (the width along the longer sides of the side face 9a of the light guide plate 9) is about 4 mm.

As described above, the reinforcing member 15A is located between the side face 9a of the light guide plate 9 and the holder 12A, and the reinforcing member 15 is located between the side face 9a of the light guide plate 9 and the holder 12. As a result of the reinforcing members 15 and 15A, each having the shape of a reversed letter C, being provided on one side of the heavy light guide plate 9, the holders 12 and 12A are protected from shock resulting from the movement of the light guide plate 9.

The shock-absorbing member 16A is fixed on the side face of the reinforcing member 15A, and is so located as to make contact with the side face 9a of the light guide plate 9 or to lie adjacent thereto (for example, with a clearance of 0.1 to 0.3 mm). Likewise, the shock-absorbing member 16 is fixed on the side face of the reinforcing member 15, and is so located as to make contact with the side face 9a of the light guide plate 9 or to lie adjacent thereto (for example, with a clearance of 0.1 to 0.3 mm).

The light guide plate 9, the reflecting plate 10, the reflector 11, the holders 12 and 12A, the light sources 13 and 14, the reinforcing members 15 and 15A, the shock-absorbing members 16 and 16A, the lead wires 17, 18, 19 and 20, the connectors 22 and 23 and the like together form the illuminating means 3.

As described above, since the reinforcing members 15 and 15A having the shock-absorbing members 16 and 16A, respectively, are provided between the light guide plate 9 and the holders 12 and 12A, it is possible to prevent the light sources 13 and 14 from being damaged as a result of the heavy light guide plate 9 being moved when the liquid crystal display device is vibrated or dropped. Moreover, the reinforcing members 15 and 15A cover the holders from three directions, and the reflector 11 has notch portions in positions where it faces the reinforcing members 15 and 15A. This ensures that the light sources 13 and 14 are reliably prevented from being damaged when the liquid crystal display device is vibrated or dropped. Furthermore, since the force exerted by the moving light guide plate 9 is hardly transmitted to the reflector 11, it is possible to reduce the deformation of the reflector 11.

Here, the benefits offered by the shock-absorbing members 16 and 16A will be described. By providing, between the hard reinforcing members 15 and 15A and the soft light guide plate 9, the shock-absorbing members 16 and 16A having the same hardness as that of the light guide plate, it is possible to reduce damage to the light guide plate 9. Moreover, since the shock-absorbing members 16 and 16A are fixed to the reinforcing members 15 and 15A, it is possible to prevent the light guide plate 9 from being damaged by the reinforcing members 15 and 15A more reliably.

Figure 8:
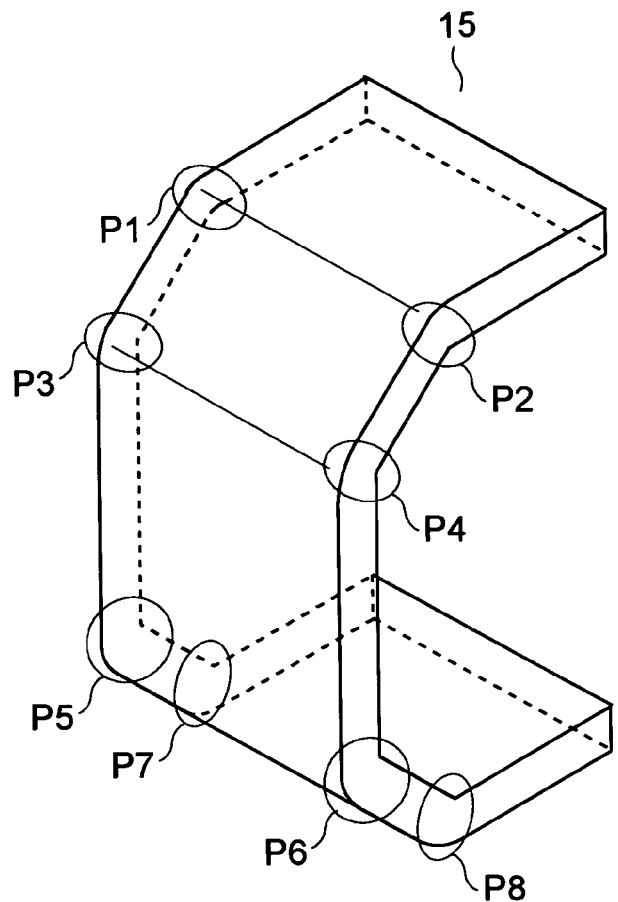
FIG. 8 is a perspective view of the reinforcing member.
Figure 9:
FIG. 9 is an image showing a bulge in the reinforcing member.
Figure 10:
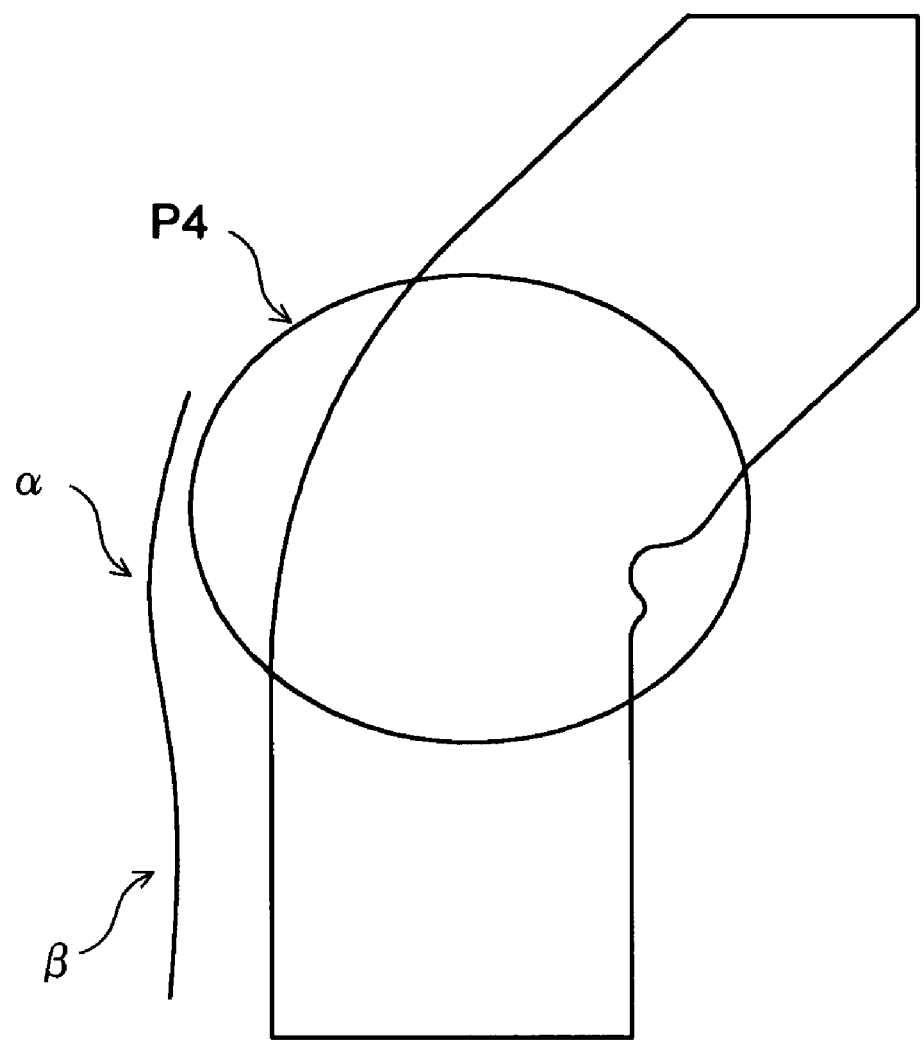
FIG. 10 is an image showing a bulge in the reinforcing member.

Additionally, as shown in FIG. 8, the reinforcing members 15 and 15A are formed by bending a metal plate. In general, bulges are developed on the side faces of the reinforcing members 15 and 15A where they are bent (when bent at a right angle, developed are bulges having a height of about 15 percent of the thickness of the metal plate; see P1 to P8 in FIG. 8) (see portions corresponding to P3 and P4 shown in the image of FIG. 9 and a portion corresponding to P4 of FIG. 10). Assume that there are no shock-absorbing members 16 and 16A. Then, due to fitting or thermal contraction, space is left between the reinforcing members 15 and 15A and the light guide plate 9. In this state, if the liquid crystal display device is dropped, the reinforcing members 15 and 15A are tilted, whereby the bulges formed therein (P3 to P6) hit the incidence plane of the light guide plate 9, and concentrated stress acts on the light guide plate 9. This may damage the light guide plate 9. To prevent such trouble, the shock-absorbing members 16 and 16A are provided. As shown in FIG. 10, a bent portion α protrudes sideways as compared to the other portion β. The light guide plate 9 and the reinforcing members 15 and 15A are designed so as to be parallel to each other. In reality, however, they are inclined toward each other, and therefore the bent portion α hits the light guide plate 9 before the other portion β hits it. This causes concentration of stress, leading to damage to the light guide plate 9.

The first supporting member 4 has formed therein a projection 25 that covers the reflector 11. There is provided a first adhesive member 26 bonded to the outer surface of the reflector 11 and to the inner surface of the projection 25 (see FIG. 3). As described above, since the reflector 11 is bonded to the projection 25 of the frame body, it is possible to prevent the reflector 11 from being deformed when the liquid crystal display device is vibrated or dropped.

A prism sheet 27 is located on the light guide plate 9. Above the prism sheet 27, a diffusing sheet 28 is located. A radiator plate 29 is located on the outer surface of the bottom face 11c of the reflector 11 (see FIG. 3). It is to be noted that the length of the bottom face 11c formed in the reflector 11 (the length in the lateral direction in FIG. 3) is about 10 mm.

The first supporting member 4 is made of, for example, plastic such as polycarbonate. The first supporting member 4 is formed as a picture frame-shaped member, and has an opening 30 at the center thereof. The first supporting member 4 has, along three sides thereof, a side wall 31b (see FIG. 4), a side wall 31c (see FIG. 5), and a side wall 31d (see FIG. 6), which extend vertically.

The first supporting member 4 has, along three sides thereof, mounting portions 32b, 32c, and 32d that are connected to the side walls 31b, 31c, and 31d, respectively, and are located around the opening 30.

Figure 4:
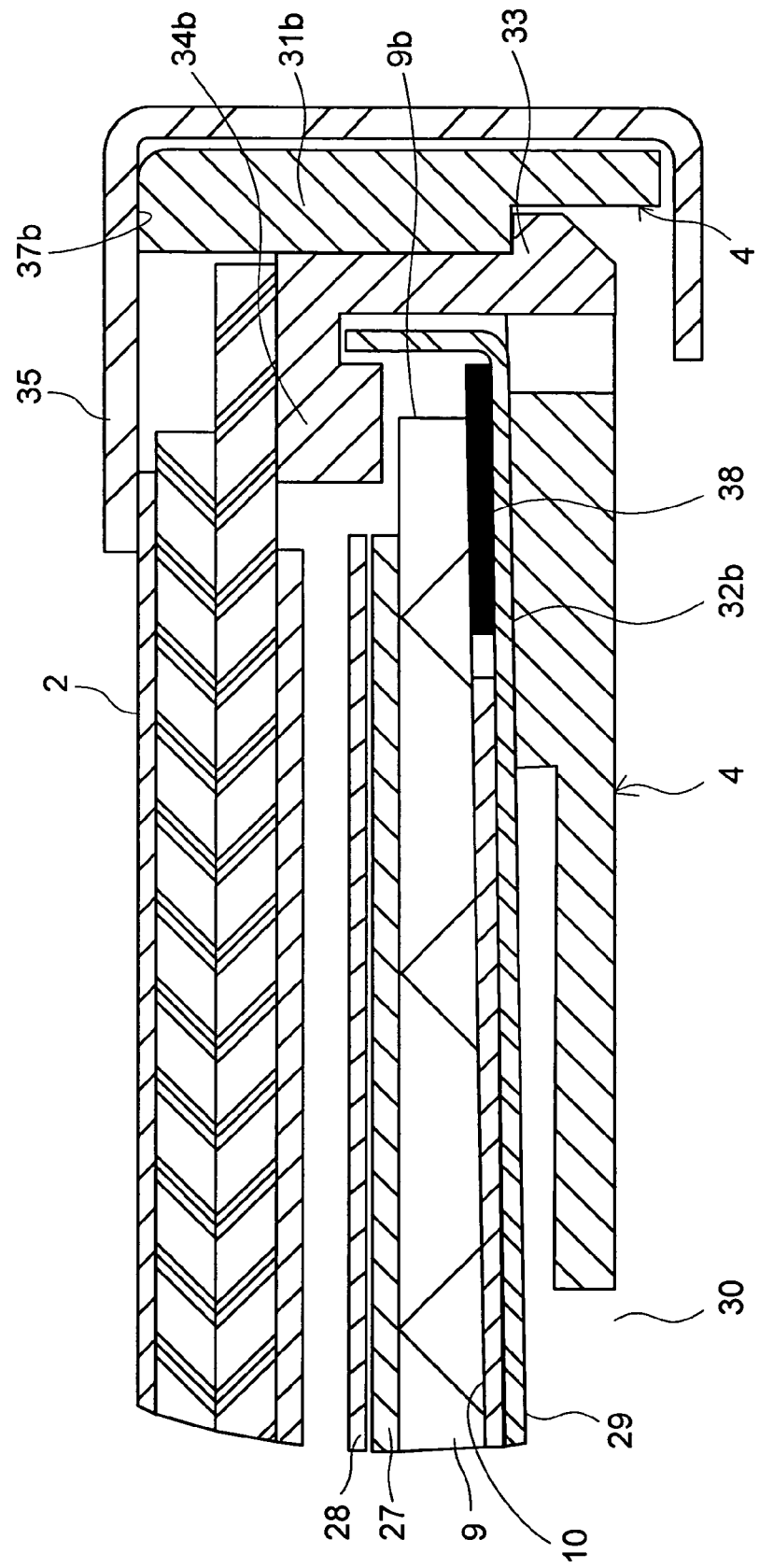
FIG. 4 is a sectional view taken on the line B-B of FIG. 2.

The second supporting member 33 is formed, as seen in cross-section, in substantially the shape of a crank (see FIG. 4). As seen in a plan view, the second supporting member 33 has an elongate shape (see FIG. 1). A hook portion formed in a lower portion of the second supporting member 33 engages with a hook portion of the side wall 31b formed in the first supporting member 4 (see FIG. 4).

The first supporting member 4 has, along one side thereof, an upper mounting portion 34a (see FIG. 3) formed in an upper portion thereof. The second supporting member 33 has an upper mounting portion 34b formed in an upper portion thereof (see FIG. 4). The first supporting member 4 has, in an upper portion thereof, an upper mounting portion 34c (see FIG. 5) and an upper mounting portion 34d (see FIG. 6).

The front-face frame 35 is made of, for example, a metal plate. The front-face frame 35 has an opening 36 at the center thereof, and is formed as a picture frame-shaped member.

An inner top face of the front-face frame 35 makes contact with a top face 37a of the first supporting member 4, and an inner side face of the front-face frame 35 makes contact with the side face 24b of the bottom plate 24 and is fixed thereto (see FIG. 3).

Likewise, the inner top face of the front-face frame 35 makes contact with a top face 37b of the first supporting member 4 (see FIG. 4).

Figure 5:
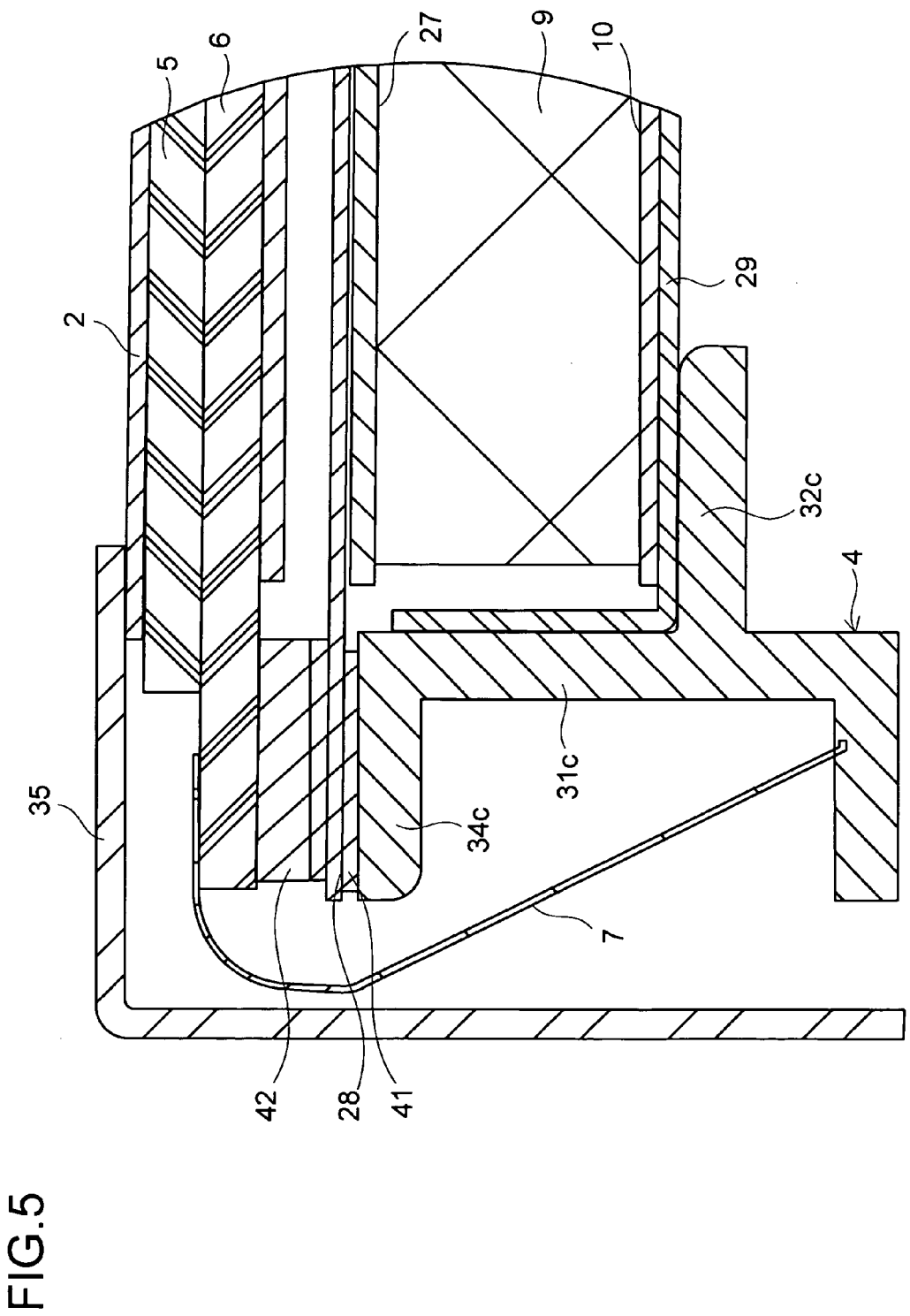
FIG. 5 is a sectional view taken on the line C-C of FIG. 2.

The inner top face and the inner side face of the front-face frame 35 cover the liquid crystal cell 2, the first supporting member 4, and the like (see FIG. 5).

Figure 6:
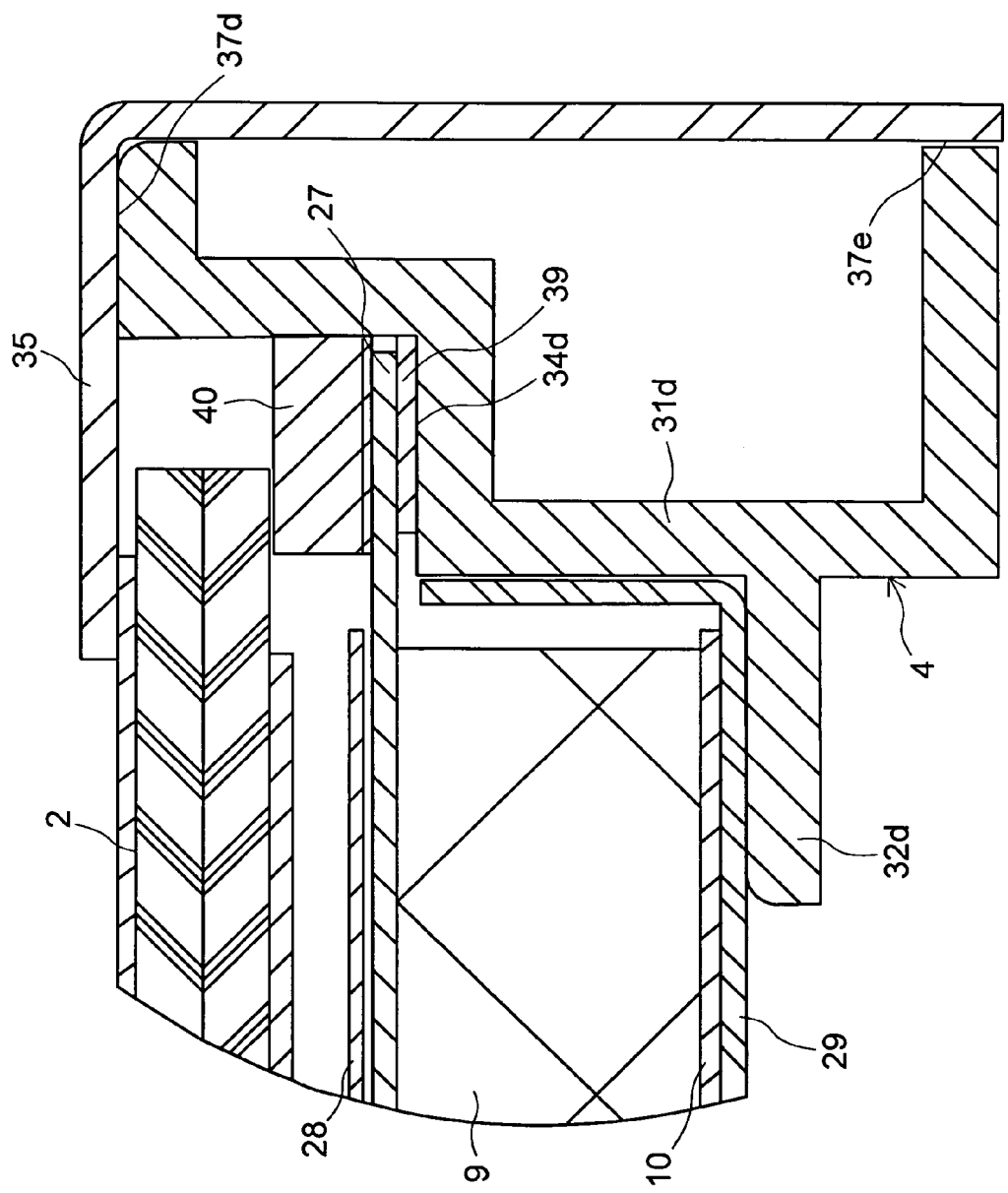
FIG. 6 is a sectional view taken on the line D-D of FIG. 2.
Figure 7:
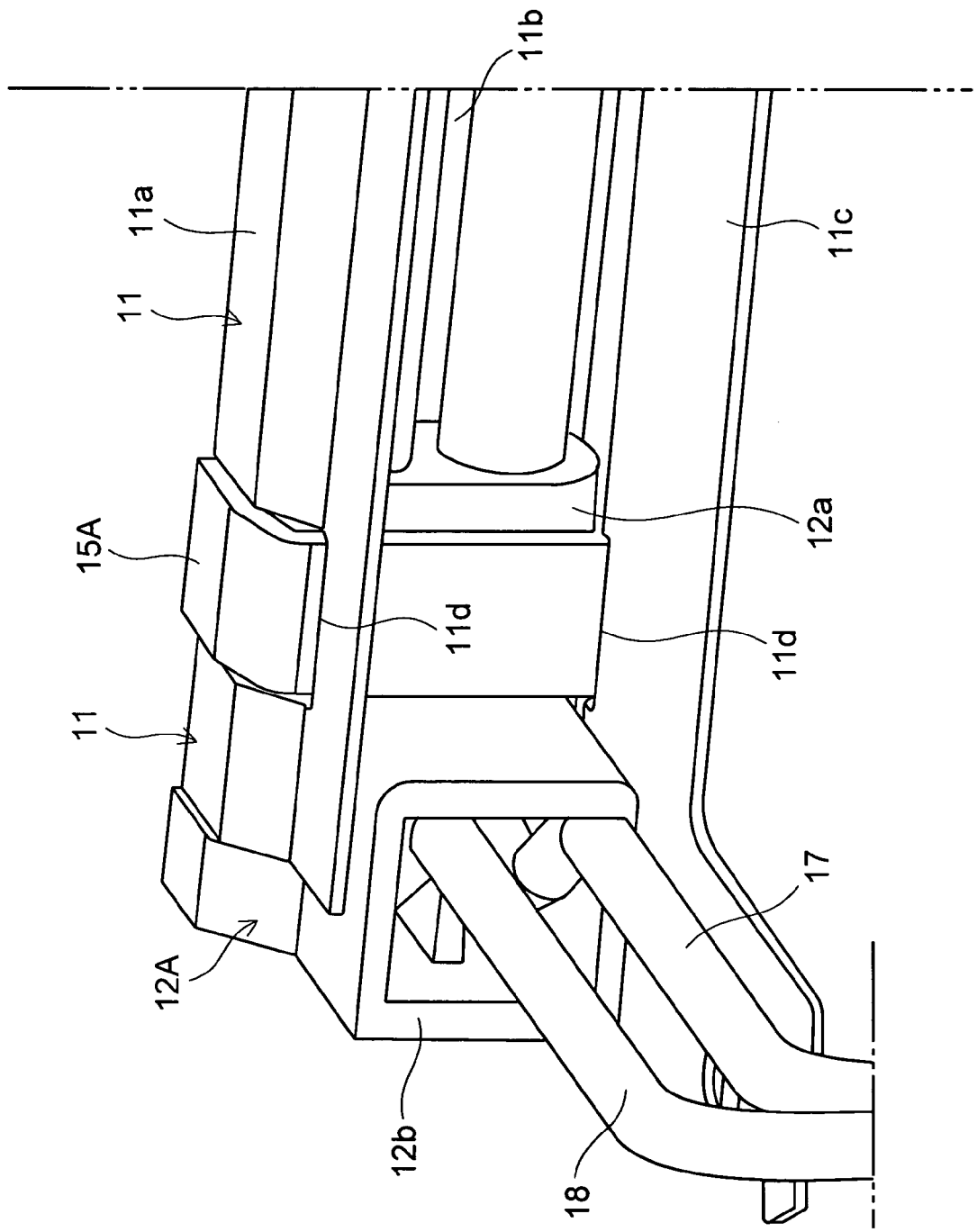
FIG. 7 is a perspective view from the direction indicated by arrow E shown in FIG. 1.

The inner top face of the front-face frame 35 makes contact with a top face 37d of the first supporting member 4, and the inner side face of the front-face frame 35 makes contact with a side face 37e of the first supporting member 4 and is fixed thereto (see FIG. 6).

The radiator plate 29 is made of, for example, aluminium, and is composed of a bottom portion and three angled portions. The radiator plate 29 is located on the mounting portions 32b, 32c, and 32d formed in the first supporting member 4 (see FIGS. 4, 5, and 6).

The reflecting plate 10 is located on the bottom portion of the radiator plate 29. The light guide plate 9 is located on the reflecting plate 10. In this way, the radiator plate 29 is exposed through the opening 30 (see FIG. 1). As described above, since the radiator plate 29 on which the light guide plate 9 and the reflecting plate 10 are laid is exposed through the opening 30 of the frame body, heat given off by the light sources 13 and 14 is released into the outside air through a three-layer structure composed of the light guide plate 9, the reflecting plate 10, and the radiator plate 29. This improves heat dissipation.

There is provided a second adhesive member 38 (see FIG. 4) bonded to a back face of the light guide plate 9 near the side face 9b thereof facing away from the side face 9a facing the light sources 13 and 14 and to a front face of the radiator plate 29. As described above, since the light guide plate 9 is bonded to the radiator plate 29 near the side face thereof facing away from the light sources 13 and 14, it is possible to reduce the movement of the light guide plate 9 caused when the liquid crystal display device is vibrated or dropped.

The prism sheet 27 is located on the light guide plate 9. The prism sheet 27 is fixed, near the right edge thereof, on the upper mounting portion 34d formed in the first supporting member 4 via an adhesive member 39. A spacer 40 is fixed on the prism sheet 27 near the right edge thereof via an adhesive member (see FIG. 6).

The diffusing sheet 28 is located on the prism sheet 27. The diffusing sheet 28 is fixed, near the left edge thereof, on the upper mounting portion 34c formed in the first supporting member 4 via an adhesive member 41. A spacer 42 is fixed on the diffusing sheet 28 near the left edge thereof via an adhesive member (see FIG. 5).

The A-A side of the liquid crystal cell 2 is located on the upper mounting portion 34a of the first supporting member 4 (see FIG. 3), and the B-B side of the liquid crystal cell 2 is located on the upper mounting portion 34b of the second supporting member 33 (see FIG. 4).

The C-C side of the liquid crystal cell 2 is located on the spacer 42 (see FIG. 5), and the D-D side of the liquid crystal cell 2 is located on the spacer 40 (see FIG. 6). This is the end of the description of the components that form the liquid crystal display device 1.

Conventionally, the light guide plate tends to be deformed (warped) over time as a result of heat or long-term application of external pressure (for example, pressure resulting from the way the light guide plate is fixed to the casing). When the light guide plate is deformed by these factors, the diffusing sheet (an uppermost optical sheet located above the backlight) interferes with the liquid crystal cell in the direction approaching the liquid crystal cell, in particular, in the direction of thickness.

As a result, the gap inside the liquid crystal cell varies from part to part. This undesirably results in wavelike abnormal display or formation of white or black regions in the liquid crystal cell.

By contrast, in the liquid crystal display device 1 of the present invention, the light guide plate is prevented from being warped (deformed) due to heat or change over time. This helps maintain an appropriate distance (a clearance in the direction of thickness) between the liquid crystal cell 2 and the diffusing sheet 28 and thereby prevent wavelike abnormal display in the liquid crystal cell 2 caused by the partial application of pressure. This contributes to improvement in the quality of the product.

That is, as shown in FIG. 5, the diffusing sheet 28 is fixed to the first supporting member 4 with the adhesive member 41. Furthermore, the spacer 42 (having an adhesive member on the face thereof where it makes contact with the diffusing sheet 28) is located on the diffusing sheet 28.

Moreover, as shown in FIG. 6, the prism sheet 27 is fixed on the first supporting member 4 with the adhesive member 39, and the spacer 40 (having an adhesive member on the face thereof where it makes contact with the prism sheet 27) is located on the prism sheet 27. With this structure, the light guide plate 9 is prevented from being deformed, and the distance between the liquid crystal cell 2 and the diffusing sheet 28 is properly maintained.

Embodiment 2

Figure 11:
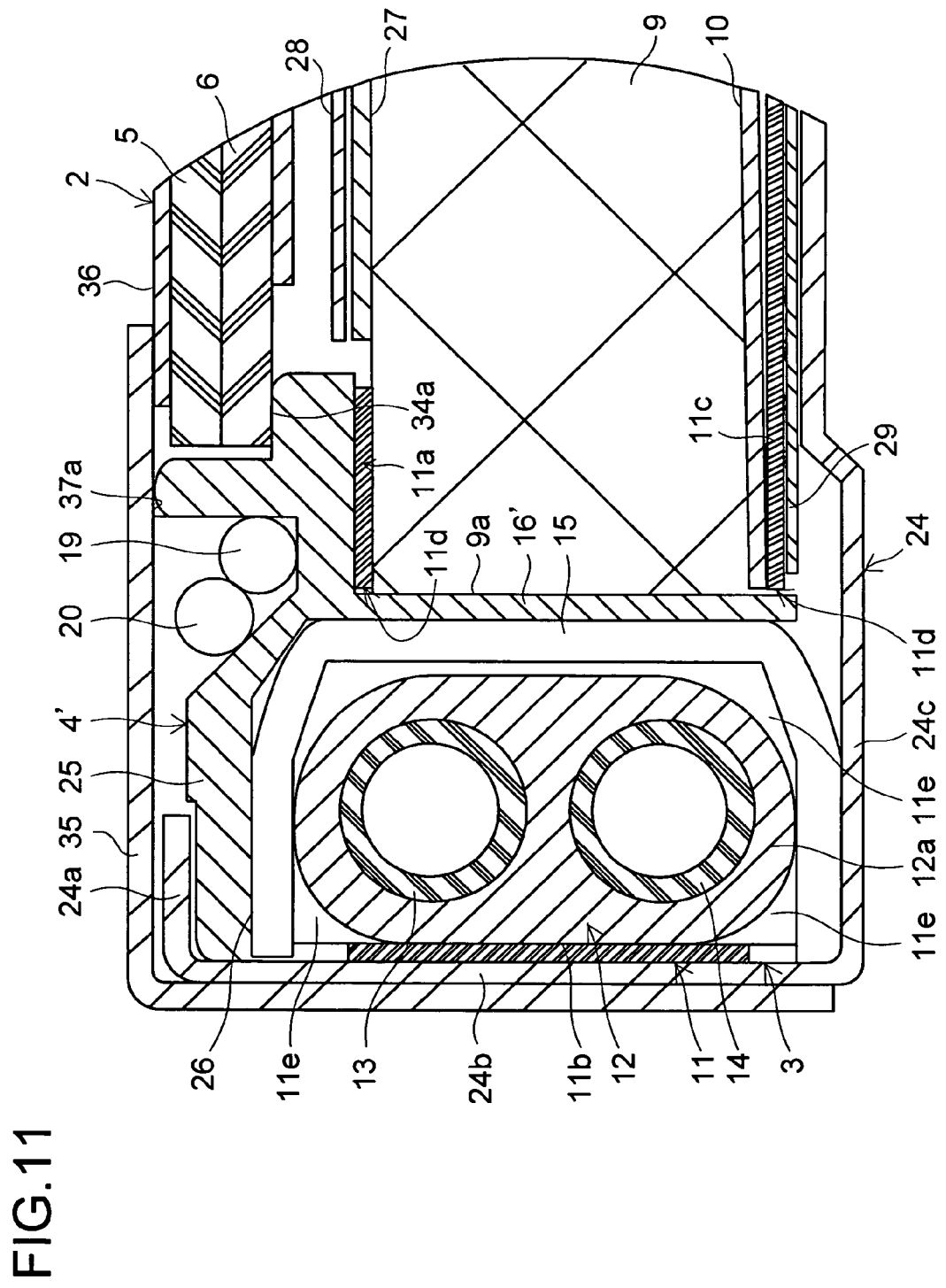
FIG. 11 is a sectional view of the holder portion of another embodiment.
Figure 12:
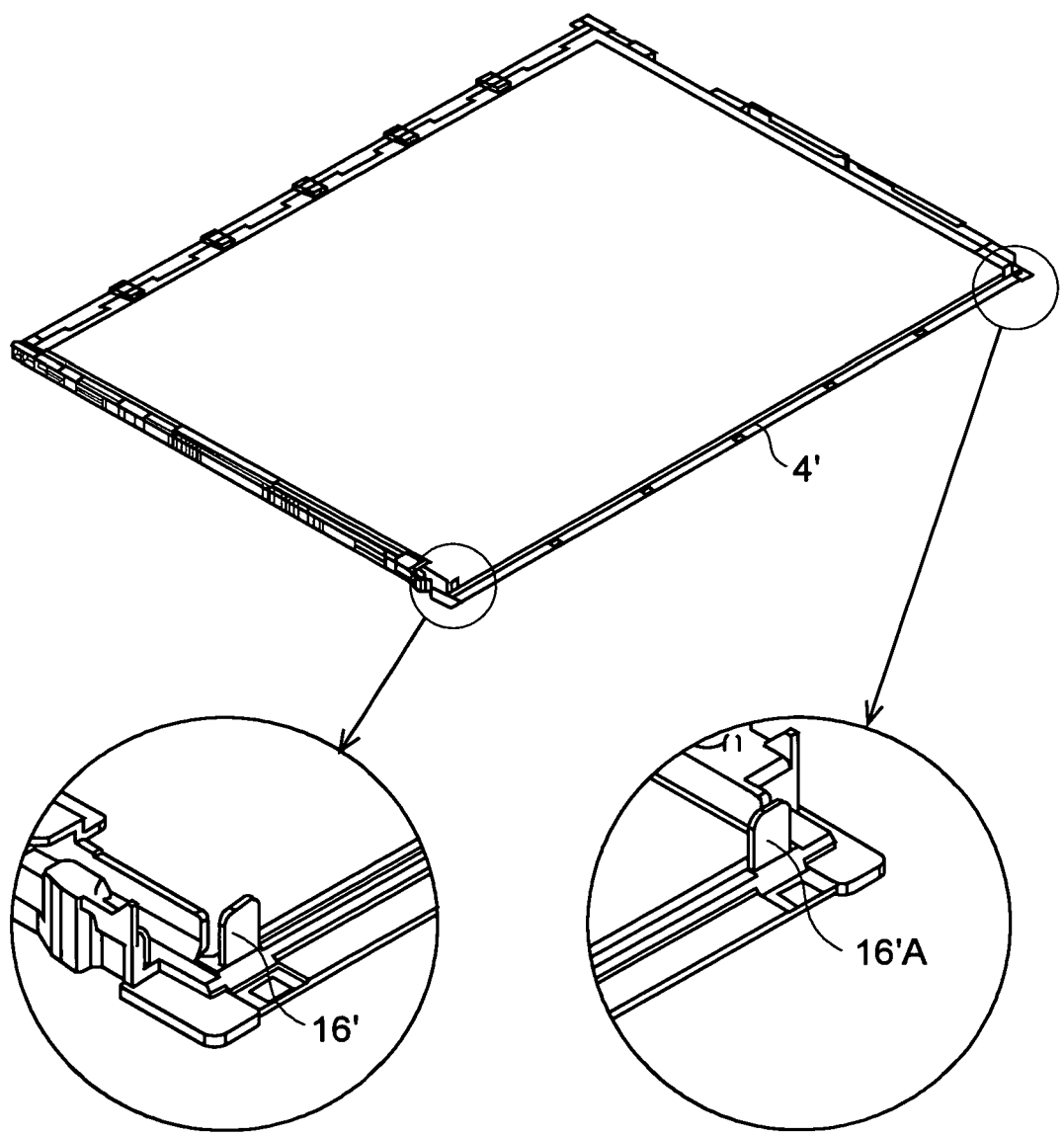
FIG. 12 is a perspective view showing the shock-absorbing member of another embodiment.
Figure 13:
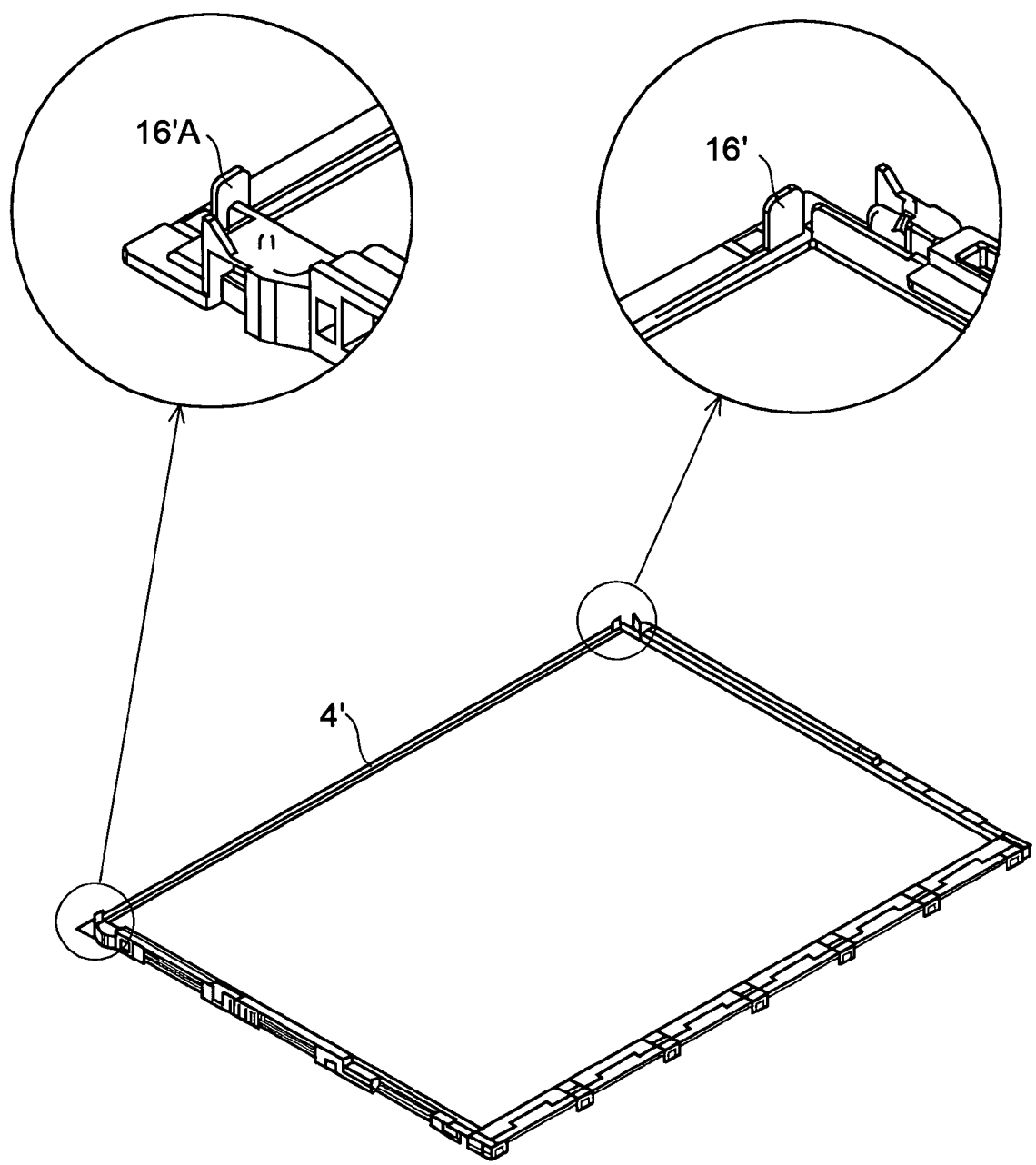
FIG. 13 is a perspective view of the shock-absorbing member of FIG. 12 but viewed in different direction.

Next, a second embodiment that differs from the first embodiment in a shock-absorbing member will be described. FIG. 11 is a sectional view of one holder portion 12, FIG. 12 is a perspective view of the first supporting member 4' showing the shock-absorbing member 16', and FIG. 13 is a perspective view of the shock-absorbing member 4' of FIG. 12 but viewed in different direction. The first embodiment described above deals with a case where the left and right shock-absorbing members 16 and 16A are fixed to the left and right reinforcing members 15 and 15A, respectively, with an adhesive. In the second embodiment, the shock-absorbing members 16' and 16'A extend from the first supporting member 4' and are not bonded to the reinforcing members 15 and 15A. As a result of the shock-absorbing members 16' and 16'A being formed integrally with the supporting member 4', they are made of plastic.

Here, the benefits offered by the second embodiment will be described. As is the case of the first embodiment, the light sources 13 and 14 are inserted into the holders 12 and 12A. The reflector 11 is formed in substantially the shape of a letter C and covers the light sources from three directions. The left and right reinforcing members 15 and 15A are formed in substantially the shape of a letter C which is opposite in direction to the reflector 11 so as to cover the left and right holders 12 and 12A, respectively, from three directions. The reflector 11 extends toward the holders 12 and 12A, and has notch portions 11e and 11eA (of which the notch portion 11eA is not shown) formed therein so as to pierce through the top and bottom faces of the letter C-shaped reflector 11. The holders 12 and 12A, the reinforcing members 15 and 15A, and the shock-absorbing members 16' and 16'A are provided inside the notch portions 11e and 11eA, respectively.

As a result of this structure, the reinforcing members 15 and 15A are assembled as follows. After the light sources 13 and 14 inserted into the holders 12 and 12A are housed in the reflector 11, the letter C-shaped reinforcing members 15 and 15A are rotatingly inserted into the notch portions 11e and 11eA of the reflector 11. Whereas in the second embodiment, the reinforcing members 15 and 15A are placed in position and then the shock-absorbing members 16' and 16'A are inserted, in the first embodiment, the reinforcing members 15 and 15A are placed in position and then the shock-absorbing members 16 and 16A are bonded thereto, respectively. As a result, in the first embodiment, when the reinforcing members 15 and 15A are to be detached to repair the light sources 13 and 14, for example, it is necessary to peel off the adhesive therefrom. By contrast, in the second embodiment, the shock-absorbing members 16' and 16'A are not bonded to the reinforcing members 15 and 15A. This makes it easy to detach the reinforcing members 15 and 15A.

Incidentally, there is provided a space so as to allow the letter C-shaped reinforcing members 15 and 15A to rotate. As a result, in the first embodiment, when the components located on the light source side and the components located on the light guide plate side are assembled together, the reinforcing members 15 and 15A rotate, resulting in poor workability. On the other hand, in the second embodiment, the shock-absorbing members 16' and 16'A formed integrally with the first supporting member 4' prevent the reinforcing members 15 and 15A from rotating. This makes assembly easy.

In the first embodiment, the shock-absorbing members 16 and 16A are provided separately, whereas in the second embodiment, the shock-absorbing members 16' and 16'A are formed integrally with the first supporting member 4'. As a result, the liquid crystal display device of the second embodiment is inexpensive and can offer good workability.

What is claimed is:

1. A liquid crystal display device comprising:
    a liquid crystal cell;
    illuminating means that is located behind the liquid crystal cell; and
    a frame body that supports the liquid crystal cell and the illuminating means, wherein
    the illuminating means includes
        a light guide plate,
        a light source that is located so as to face one side face of the light guide plate, and
        a holder that supports the light source,
    there is provided a reinforcing member between the light guide plate and the holder, there is provided a shock-absorbing member located on a side face of the reinforcing member and that makes contact with or lies adjacent to the one side face of the light guide plate, the reinforcing member is so formed, as seen in cross-section, as to cover the holder from three directions, there is provided a reflector that covers the light source and that is open toward the light guide plate, and the reflector has a notch portion in a position where the reflector faces the reinforcing member.

2. The liquid crystal display device of claim 1, wherein the shock-absorbing member is fixed to the reinforcing member.

3. The liquid crystal display device of claim 1, further comprising;

a reflector that covers the light source and that is open toward the light guide plate, wherein the frame body has formed therein a projection that covers the reflector, and there is provided a first adhesive member that is bonded to the reflector and to the projection.

4. The liquid crystal display device of claim 1, wherein the frame body is formed as a picture frame-shaped member having a mounting portion around an opening, the liquid crystal display device further comprises
a radiator plate located on the mounting portion, and
a reflecting plate located on the radiator plate, and
the light guide plate is located on the reflecting plate, and the radiator plate is exposed through the opening.

5. The liquid crystal display device of claim 4, wherein there is provided a second adhesive member bonded to a back face of the light guide plate near another side face of the light guide plate facing away from the one side face thereof facing the light source and to a front face of the radiator plate.

6. The liquid crystal display device of claim 1, wherein the frame body has a first supporting member that supports the liquid crystal cell, and the shock-absorbing member is formed integrally with the first supporting member.

7. A liquid crystal display device comprising:

a liquid crystal cell;

illuminating means that is located behind the liquid crystal cell; and a frame body that supports the liquid crystal cell and the illuminating means, wherein the illuminating means includes
a light guide plate,
a light source that is located so as to face one side face of the light guide plate, and
a holder that supports the light source, there is provided a reinforcing member between the light guide plate and the holder, there is provided a shock-absorbing member located on a side face of the reinforcing member and that makes contact with or lies adjacent to the one side face of the light guide plate, the frame body has a first supporting member that supports the liquid crystal cell, and the shock-absorbing member is formed integrally with the first supporting member.

\* \* \* \* \*